United States Patent [19]
Broersma

[11] Patent Number: 5,699,561
[45] Date of Patent: Dec. 23, 1997

[54] SELF-CONTAINED BICYCLE HELMET AND MOLDING PROCESS THEREFOR

[75] Inventor: Lester Broersma, Jamul, Calif.

[73] Assignee: Troxel West, San Diego, Calif.

[21] Appl. No.: 673,256

[22] Filed: Jun. 28, 1996

[51] Int. Cl.⁶ ............................................. A42B 3/00
[52] U.S. Cl. .................. 2/412; 2/411; 2/425; 264/45.4; 264/154
[58] Field of Search ........................... 2/410, 411, 412, 2/414, 425; 264/41, 45.4, 45.5, 45.6, 154, 155

[56] References Cited

U.S. PATENT DOCUMENTS 5,193,264  3/1993  Brown ..................... 264/46.5

Primary Examiner—Michael A. Neas
Attorney, Agent, or Firm—Walter W. Duft

[57] ABSTRACT

A bicycle helmet and bicycle helmet molding process provide an impact attenuating bicycle helmet/shell having the advantages of low cost, ease of manufacture, as well as ruggedness and durability. In preferred embodiments, a shell having inner and outer walls defining a sealable cavity is provided and an access hatch is formed in the outer wall. The cavity is fully or partially filled through the access hatch with an impact attenuating material. The helmet is treated if necessary to cause the impact attenuating material to harden or fuse or otherwise remain within the sealable cavity, and a plug is used to close the access hatch, thus providing a superior bicycle helmet/shell wherein the impact attenuating material is trapped within the shell portion of the product.

12 Claims, 3 Drawing Sheets

SELF-CONTAINED BICYCLE HELMET AND MOLDING PROCESS THEREFOR

BACKGROUND OF THE INVENTION

The present invention relates to bicycle helmets and methods for their manufacture. More particularly, the invention is directed to the manufacture of bicycle helmets having impact attenuating components for improved protection and reliability.

Known methods for manufacturing bicycle helmets contemplate the fabrication of a helmet shell having a hard outer surface and an impact resistant liner mounted to the inside of the shell. Helmet shells have been made through resin/cloth laminating processes, injection molding and vacuum forming so as to produce a generally hemispheric shape having a singular wall thickness of approximately 0.030–0.250 inches. The impact attenuating helmet liners have been made from expandable resin beads such as expandable polystyrene (E.P.S.) and expandable polypropelene (E.P.P.) beads. The liners are formed by introducing the expandable resin bead material into an enclosure, which is typically a helmet-shaped mold that has been fitted with several small openings that act as steam ports. Steam is passed through the ports in order to expand and fuse the beads into a solid liner component that can be attached to the helmet shell. Alternatively, the helmet shell itself can be placed into the mold before the expandable bead material is introduced through appropriate piping. Subsequently, the bead is permeated with steam being introduced from only one half (or side) of the mold.

Daly, U.S. Pat. No. 3,935,044, discloses a helmet with a double skinned shell and an intermediate liner made by first molding an inner skin, then molding the liner over the inner skin, and finally molding an outer skin over the liner.

Lemelson, U.S. Pat. No. 4,075,717, discloses still another approach in which an integral dual skinned helmet and liner are formed by "sandwich molding" such that the liner is trapped between the inner and outer helmet skin portions. Lemelson further discloses forming a helmet via rotational molding to provide inner and outer skins, and injecting a liner material therebetween.

It is submitted that improvements in construction and manufacturing efficiency could be realized by providing a bicycle helmet and method of manufacture therefor that does not require the time consuming step of manufacturing a separate helmet liner which must then be fitted into and attached to a separate shell by adhesive or other methods of attachment. It would be further desirable in a double-skinned configuration, to provide a manufacturing method that utilizes a simple molding technique and allowed the manufacturer an opportunity to select from a wide variety of liner materials and to carefully control the introduction of such material into the helmet and the subsequent processing thereof. What is needed is a bicycle helmet and manufacturing method that reduces the number of steps and mold elements required to produce the product in a cost efficient manner.

SUMMARY OF THE INVENTION

In accordance with the foregoing objectives, a bicycle helmet and bicycle helmet molding process provide an impact attenuating bicycle helmet/shell having the advantages of low cost, ease of manufacture, ruggedness and durability. In preferred embodiments of the invention, a shell having inner and outer walls defining a sealable cavity is provided that includes an access hatch formed in the outer wall. The cavity is fully or partially filled through the access hatch with an impact attenuating material (expandable or otherwise), and the helmet is preferably treated as necessary to cause the impact attenuating material to harden or fuse or otherwise remain within the sealable cavity. A plug is used to close the access hatch after filling the cavity. The result is a novel bicycle helmet/shell wherein the impact attenuating material is trapped within the cavity portion of the shell, thus providing a superior bicycle helmet product.

DETAILED DESCRIPTION OF THE PREFERRED EMBODIMENTS

Figure 1:
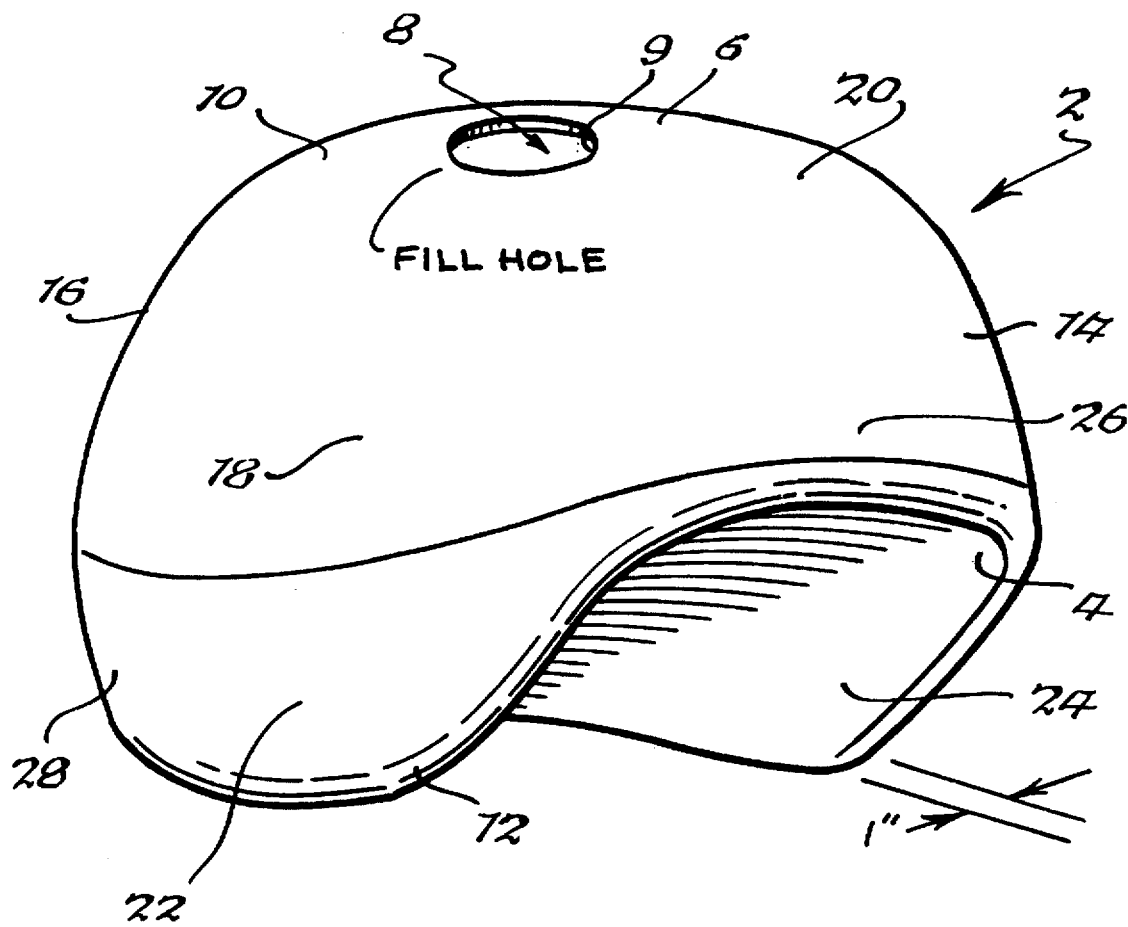
FIG. 1 is a projected view of a helmet shell created in accordance with a preferred aspect of the present invention.

Referring now to FIG. 1, an impact attenuating helmet shell 2 can be formed by any conventional molding technique, including vacuum forming, but is preferably constructed using a blow molding process in order to create a shell structure having inner and outer walls 4 and 6, respectively. The walls 4 and 6 are formed as a result of the molding process and are integral. They are not separately constructed and subsequently joined together. The walls 4 and 6 define an interior cavity 8 between the walls and a hatch 9 is formed in the outer wall 6 providing access to the cavity 8. The hatch 9 is preferably circular in shape and can be formed either during the molding process using an appropriately configured mold, or could be subsequently formed by cutting a hole in the outer wall 6. Blow molding processes are well known and rely on pressurized air to create hollow vessels whose sides conform to a mold in which the pressurized air is introduced. In the case of helmet shell 2, pressurized air creates the cavity 8 by forcing apart molten plastic material against the sides of an appropriately shaped mold (not shown) whose configuration defines the shape of the helmet walls 4 and 6. A preferred wall thickness of the helmet shell 2 is approximately $\frac{1}{16}$th of an inch, while the hollow space between the walls, i.e., the cavity 8, is preferably about one inch at its widest point. Many other combinations of wall thicknesses and wall spacings could also be employed, although it is preferable that the wall spacing not be less than about $\frac{5}{8}$ of an inch.

The helmet shell 2 is sized and configured to provide the impact protection required in a conventional bicycle helmet. The helmet shell includes a top section 10, a lower rim 12, a front section 14, a rear section 16 and a pair of side sections 18 and 20. The lower rim 12 extends generally forwardly from the rear helmet section 16 to define a pair of ear protection areas 22 and 24, and then extends upwardly to define a forehead protection area 26. The rear portion of the rim 12 defines a rearward neck protection area 28. It will be appreciated by persons skilled in the art that many other helmet configurations could be employed without departing from the scope of the present invention.

Figure 2:
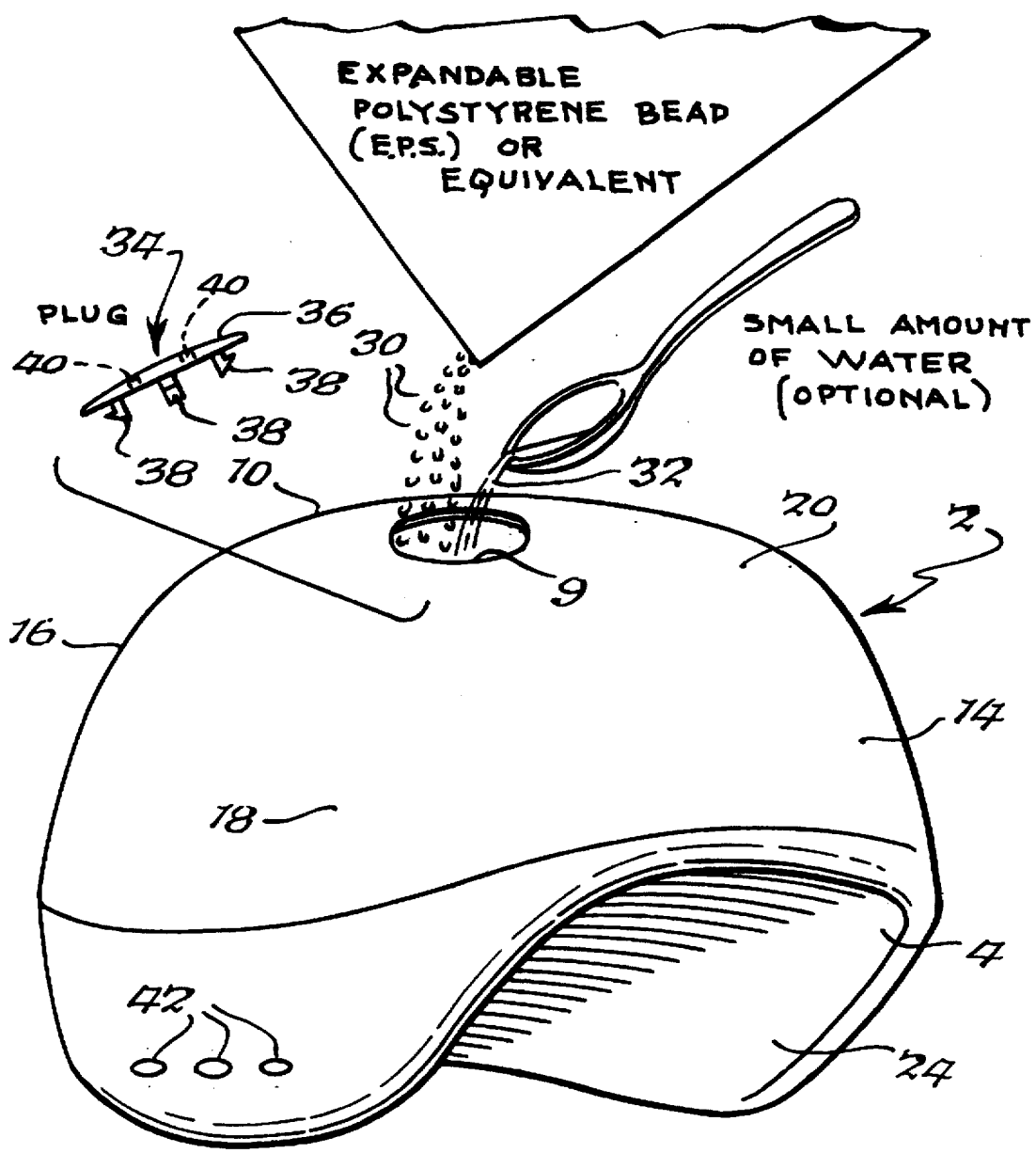
FIG. 2 is a projected view of the helmet shell of FIG. 1 showing the introduction of an attenuating material therein.

Referring now to FIG. 2, the helmet shell 2 is filled with a flowable impact attenuating material after the blow molding process is completed. More specifically, the cavity 8 is filled with a quantity of impact attenuating material 30 which may include expandable polystyrene (E.P.S.) beads, expandable polypropelene (E.P.P.) beads, or any other appropriate material, whether natural or man-made, including foam systems (described in more detail hereafter) and equivalents thereof. Suitable impact attenuating materials thus include compositions having impact attenuating qualities when introduced into the helmet shell 2, such as beads, and compositions whose impact attenuating qualities develop following their introduction into the helmet, such as foam producing chemicals. Although preferred impact attenuating materials will fuse or harden in order to form a finished helmet, it may also be possible to utilize an impact attenuating material representing a tightly packed arrangement of non-fused elements (as in a "bean bag"), or perhaps a viscous gel or other substance which is not necessarily fused or hardened, yet which attenuates impacts nonetheless. Advantageously, the access hatch 9 is formed to be large enough to enable easy introduction of liner material into the cavity 8 via a scoop or the like. To that end, the access hatch 9 preferably has a diameter in a range of about 1–2 inches.

In the case of expandable material such as E.P.S. or E.P.P. beads, the amount of expandable bead material to be added to the cavity 8 depends on the size of the cavity and the amount of pre-expansion of the material prior to incorporation in the cavity 8. In the case of raw, non-expanded E.P.S. or E.P.P. beads, the cavity 8 is preferably partially filled to about half of its volumetric capacity so that the beads completely fill the cavity 8 when expanded. For pre-expanded E.P.S. or E.P.P. beads, the cavity 8 can be filled to capacity. Although both raw and pre-expanded beads can be used in accordance with the present invention, pre-expanded beads are preferred because the density of the impact attenuating material is more readily controlled.

Following the introduction of the impact attenuating material 30 into the cavity 8, and depending on the nature of the material, and whether it will be fused or hardened, a small quantity of water 32 can be optionally added to provide a steam source during subsequent processing. The amount of water to be added depends on the amount of steam required to expand the material 30. In the case of raw E.P.S. or E.P.P. beads, several teaspoons of water may be required. In the case of pre-expanded beads, water may not need to be added at all.

Figure 3:
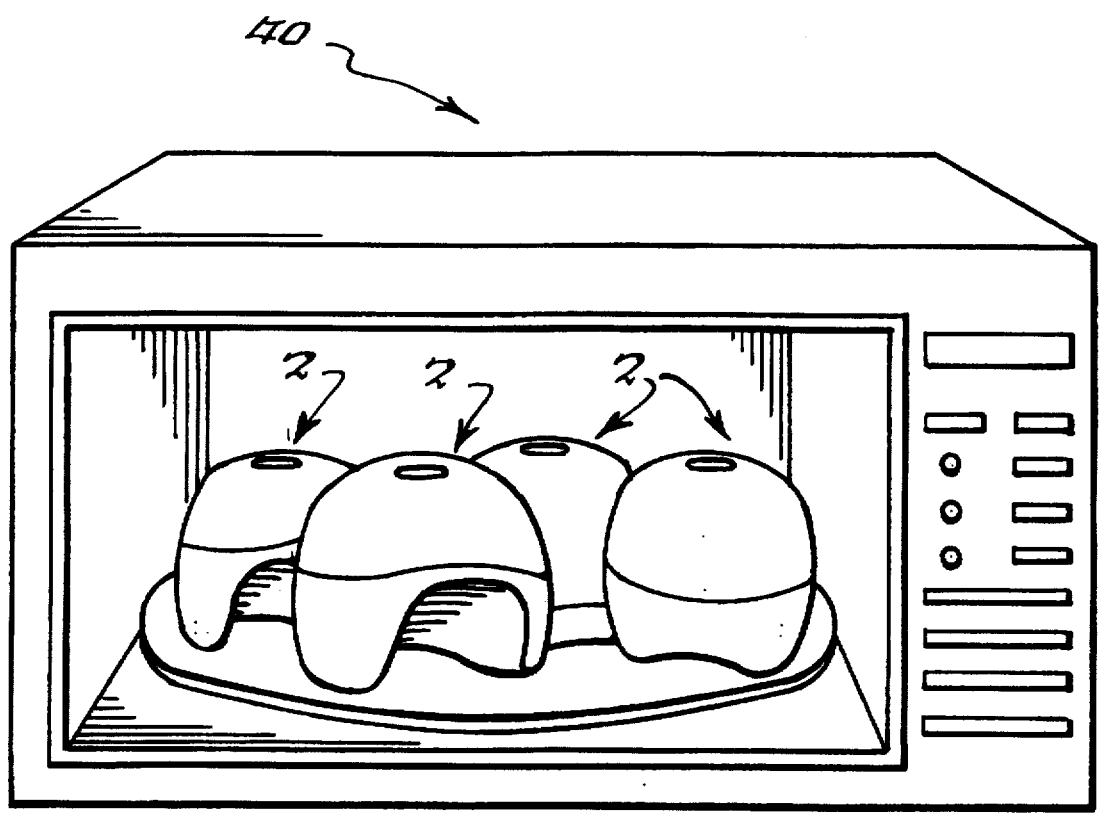
FIG. 3 is a projected view of a plurality of helmet shells undergoing heat treatment in accordance with a preferred aspect of the present invention.

Referring now to FIG. 3, and again, depending on the nature of the impact attenuating material 30 and whether it will be fused or hardened, the filled helmet 2 can be optionally placed in an appropriate heating device, such as a conventional microwave oven 40, and heated to a suitable temperature in accordance with the characteristics of the impact attenuating material. This option is preferred if water is introduced into the cavity 8. Heating causes the water 32 within the cavity 8 to produce steam, thus expanding the material 30 into a fused or hardened impact attenuating structure that fills the helmet cavity 8. Optional heating methods would include immersing the bead-filled helmet 2 in boiling water for several minutes, or injecting steam into the helmet cavity 8. When no water is added to the cavity 8, as in the case of pre-expanded beads, neither heat nor any other treatment (other than keeping the helmet at room temperature) may be required in order for the impact attenuating material to fuse or harden within the cavity 8.

Following heat processing, or filling with material 30 when no heat processing is used, a plug 34 may be used to plug the access hatch 9 and seal the cavity 8. The plug 34 preferably includes a generally circular disk portion 36 that closes the cavity 8, together with a plurality of clips, prongs or other appropriate securement members 38 for engaging the inside of the outer wall 6. The prongs 38 secure the plug 34 in position in the hatch 9 such that the outer surface of the disk portion 36 is flush with the outside of the outer wall 6. Optionally, the plug 34 could be formed with vents 40 and inserted prior to heating, in which case steam would be permitted to escape during the heating process. A further option would be to insert a solid plug 34 prior to heating and to place steam vents 42 at other locations on the helmet, as shown in FIG. 2. The steam vents 42 could be formed by one or more small perforations formed in the outer wall 6.

As described above, expandable beads are not the only materials which can be used for impact attenuation. Other appropriate materials would include, by way of example, a two-part urethane foam system including constituents that are poured into the helmet cavity 8. Upon exposure to each other, the constituents chemically react together to form a fused or hardened impact attenuating material that fills the helmet cavity. The quantity of two-part urethane foam system constituents to pour into the cavity 8 is dependent on the size of the cavity 8 and the expected degree of expansion appropriate for the materials used, so as to completely fill the helmet cavity 8 once the two part system is fully hardened.

As described above, other impact attenuating materials may not fuse or harden at all within the cavity 8 yet still be suitable for use. In that case, the only treatment required for ensuring that the material remains within the cavity may be to seal the cavity with a plug.

While various preferred embodiments of the present invention have been described, it will be understood that modifications and adaptations thereof may occur to persons skilled in the art. Therefore, the protection afforded the invention should not be limited except in accordance with the spirit of the following claims and their equivalents.

I claim:

1. A method for constructing a bicycle helmet having impact attenuating components, comprising the steps of:

molding a shell having integral inner and outer walls defining a cavity;

forming an access hatch in said outer wall, to provide entry to said cavity;

filling said cavity with an impact attenuating material inserted through said access hatch, said access hatch being of sufficient size to facilitate scooping of said impact attenuating material into said cavity;

treating said helmet as necessary to cause said impact attenuating material to remain in said cavity; and closing said access hatch with a plug.

2. The method of claim 1 wherein said shell forming step includes blow molding the shell.

3. The method of claim 1 wherein said cavity filling step includes filling said cavity with an expandable material that hardens over a characteristic temperature range, and wherein said helmet treating step includes maintaining said helmet within said temperature range for a time sufficient to permit said expandable material to expand.

4. The method of claim 1 wherein said cavity filling step includes filling said cavity with chemically reactive materials that form an impact attenuating material when combined.

5. The method of claim 1 wherein said cavity filling step includes filling said cavity with a two-part urethane material.

6. The method of claim 1 wherein said cavity filling step includes filling said cavity with expandable beads, and wherein said treating step includes applying heat to expand said beads so as to completely fill said cavity.

7. The method of claim 6 wherein said heating step includes using a microwave oven.

8. The method of claim 6 wherein said heating step includes immersing said helmet in heated water.

9. The method of claim 6 wherein said heating step includes injecting steam into said cavity.

10. The method of claim 1 wherein said cavity filling, said treating and said closing steps include filling said cavity with a resilient bead material applying no heat treatment, and closing said access hatch, such that said bead material remains in a permanent unfused state in said helmet following completion of said hatch closing and thereafter.

11. A method for constructing a bicycle helmet having impact attenuating components, comprising the steps of:

blow molding a shell having inner and outer walls defining a sealable cavity;

forming an access hatch in said outer wall;

filling said cavity through said access hatch with an impact attenuating material, said filling step including filling said shell with an expandable material that fuses or hardens over a characteristic temperature range, said filling step further including adding a selected quantity of water to said cavity through said access hatch; and treating said helmet as necessary to cause said impact attenuating material to fuse, including maintaining said helmet within said temperature range for a time sufficient to permit said expandable material to expand, said temperature range being maintained by heating said water to form steam to expand said beads, said water being heated using microwave heating; and closing said access hatch with a plug.

12. A method for constructing a bicycle helmet having impact attenuating components, comprising the steps of:

molding a shell having integral inner and outer walls defining a cavity;

forming an access hatch in said outer wall to provide entry to said cavity;

filling said cavity with beaded impact attenuating material inserted through said access hatch;

closing said access hatch with a plug; and applying no heat to said helmet such that said beaded impact attenuating material remains in a beaded state in said cavity.

* * * * *

UNITED STATES PATENT AND TRADEMARK OFFICE
CERTIFICATE OF CORRECTION

PATENT NO. : 5,699,561
DATED : December 23, 1997
INVENTOR(S) : Lester Broersma

It is certified that error appears in the above-identified patent and that said Letters Patent is hereby corrected as shown below:

```
    On the title page, after "U.S. PATENT DOCUMENTS" insert:
--3,935,044    1/1976    Daly --------------- 156/79
  3,992,721    11/1976   Morton -------------
  4,075,717    2/1978    Lemelson ----------- 2/412
  4,466,138    8/1984    Gessalin -----------
```

On the title page, after "5,193,264   3/1993 Brown -------- 264/46.5,"insert:

--FOREIGN PATENTS OR APPLICATIONS

```
468,675      1/1992     EPO ---------------- A42B 3/12
93/08711     5/1993     WIPO --------------- A42B 3/00--.
```

In column 5, line 5, insert --,-- after "material".
In column 6, line 9, change "wails" to --walls--.

Signed and Sealed this

Seventh Day of April, 1998

*Attest:*

BRUCE LEHMAN

*Attesting Officer*   Commissioner of Patents and Trademarks